3,791,957
COAL HYDROGENATION USING PRETREATMENT REACTOR
Ronald H. Wolk, Lawrence Township, Trenton County, N.J., assignor to Hydrocarbon Research, Inc., New York, N.Y.
Filed Dec. 13, 1971, Ser. No. 207,231
Int. Cl. C10g 1/06
U.S. Cl. 208—10                                             7 Claims

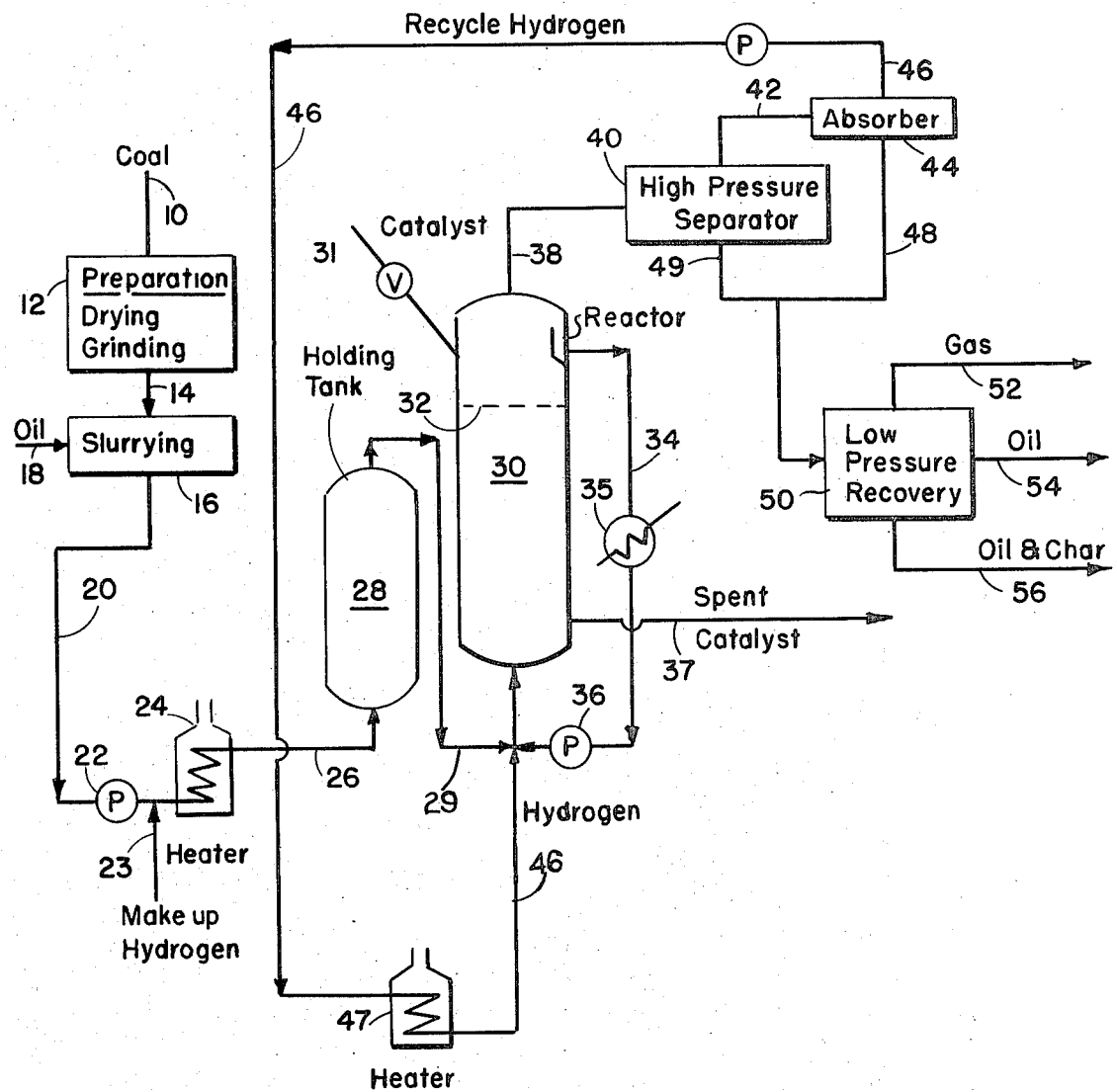

ABSTRACT OF THE DISCLOSURE

In the liquid phase catalytic hydrogenation of coal, improved operation is obtained by initially passing the pressurized and preheated coal-oil slurry containing relatively large coal particles through a pretreatment reactor, wherein the coal particles are partially dissolved to produce fine particles so that a better control of ebullation can be achieved in the final upflow catalytic reactor.

BACKGROUND OF THE INVENTION

U.S. Pat. No. 3,519,555, describes a relatively newly developed technique for operating hydrogenation reactors which is now generally known as "ebullation." In that patent, it is noted that if a reaction zone is partially filled with particulate solids such as catalyst and a gas such as hydrogen is passed upwardly through the bed together with a liquid such as a coal slurry, it is possible to obtain a greatly improved reaction due to the random motion of the particles in the liquid with a limited pressure drop, and with a substantial uniformity of reaction zone temperature. It was found possible to hydrogenate coal, as described in such patent, to produce very substantial yields of liquid suitable as synthetic crude oil.

In accordance with such patent, it was considered necessary to use a coal of about 100 mesh (U.S. Std.) and preferably of relatively close sizing, i.e., all passing 50 mesh and not less than 80% retained on 200 mesh. While the desired preciseness of size will vary between different types of coal, lignite and shale, nevertheless the fine grinding required for satisfactorily processing coal in the ebullated bed reactor involved a number of commercial difficulties.

To achieve high overall hydrogenation of coal, it is usually desirable to use a fine size catalyst in the reactor bed. The smaller particle catalyst has a greater external surface area, which contributes to its higher hydrogenation activity. Also, the smaller particle size catalyst may exhibit more resistance to poisoning by coke and metals as a result of the greater relative geometric surface area. Furthermore, it is usually also a better coal hydrogenation catalyst since it will operate at a lower temperature to give substantially the same coal conversion with the high liquid and low gas yields.

Use of fine size catalysts in an upflow ebullated bed type reactor presents certain problems. If the coal and catalyst are approximately of the same fine particle size and density and have about the same fluidization characteristics, the coal will displace part of the catalyst material from the reactor bed. However, if the coal particles are larger than the catalyst particles, the velocity used in the reactor to fluidize the catalyst will not be sufficient to fluidize the incoming coal. The coal particles will fall out of suspension at the bottom of the reactor and will cause or contribute to plugging and maldistribution before they can be dissolved.

SUMMARY OF THE INVENTION

I have discovered that the combination of an inline coal pretreatment reactor followed by a catalyst-filled ebullated bed reactor utilizing fine size catalyst assures continuous ebullation (bed expansion and random motion of the catalyst) and good hydrogenation of coarsely crushed coal without carryover or slumping of coal in the upflow reactor and proves to be a substantial improvement over prior operations. Not only is expensive grinding of the feed coal avoided, but use is permitted of the finer, more reactive catalyst materials in the main ebullated bed reactor.

Accordingly, the principal object of this invention is to provide means for achieving a high percentage hydrogenation of coal, wherein the feed coal is conveniently crushed to relatively large particle sizes, slurried with a hydrocarbon liquid, pretreated with hydrogen in a pretreatment reactor for substantial breakup of the relatively coarse coal particles, then introducing the pretreated coal slurry into a catalytic upflow reactor for further hydrogenation.

It is a further object of this invention to provide improved operation of the catalytic reactor by permitting use of finer particle size catalyst therein by pretreating the coarse coal in the pretreatment reactor in which substantial breakup of the coarse coal particles is achieved.

DESCRIPTION OF THE DRAWING

The drawing shows a schematic arrangement of the essential coal conversion equipment necessary to incorporate the invention.

DESCRIPTION OF THE PREFERRED EMBODIMENT

As shown, a coal such as bituminous, semi-bituminous, sub-bituminous or lignite, or a similar material such as shale, entering the system at 10 is first passed through a preparation unit generally indicated at 12. In such a unit it is desirable to dry the coal of substantially all surface moisture and to grind the coal to a desired mesh and then to screen it for uniformity. For my purposes, it is desirable that the coal particles are sized to substantially all pass 20 mesh with not less than 80% retained on 50 mesh (U.S. Std.). However, it will be observed that the preciseness of size may vary between types of coal, lignite and shale.

The coal discharges at 14 into the slurry tank 16 where the coal is blended with a carrying oil stream 18 which, as hereinafter pointed out, is conveniently made in the system. To establish an effective transportable slurry, it is found that the ground coal should be mixed with at least about an equal weight of carrying oil and usually the weight ratio is not more than ten parts of oil to one part of coal.

The resulting coal-oil slurry at 20 is pumped to reactor pressure by pump 22 and make-up hydrogen gas is added in stream 23. The resulting slurry mixture, pressurized to 500 to 5000 p.s.i. partial pressure of hydrogen and preferably to 1000 to 4000 p.s.i., is then passed through heater 24 to bring the slurry up to a temperature in the order of 600° F. to 750° F. Such heated slurry then discharges into the feed line 26 and is passed to pretreatment reactor 28 wherein a dissolving action occurs on the coarse coal particles. A space velocity based on coal feed of between 50 to 300 pounds of coal per hour per cubic foot of reactor volume is used in reactor 28. The make-up hydrogen requirements of line 23 are usually 5 to 25 s.c.f. of equivalent hydrogen per pound of dry coal feed.

In the pretreatment reactor 28, the relatively coarse coal particles in the coal-oil slurry tend to break up rather quickly and partially dissolve under the effect of moderately high pressure and temperature and in the presence of hydrogen to produce considerably finer coal particles than fed to the reactor 28. Such fine coal particles are found to be much more suitable for further hydrogenation reaction.

Following such preliminary treatment in pretreatment reactor 28, the entire mixture of coal-oil slurry and hydrogen passes by line 29 to ebullated bed reactor 30. This reactor is supplied with recycle hydrogen, usually at 75 to 80% purity, in line 46 which is heated to about 1000° F. in heater 47. The slurry passes upwardly in reactor 30 at a rate and under pressure and at a temperature sufficient to accomplish the desired hydrogenation. Usually temperatures are in the order of 800–950° F. and pressures are between about 500 and 5000 p.s.i. (expressed as partial pressure of hydrogen at the reactor inlet).

By concurrently flowing the streams of liquid and gasiform material upwardly through the ebullated bed reactor 30 vessel containing a mass of solid particles of a contact material, which may be a specific particulate catalyst material added at 31, and expanding the mass of solid particles by at least 10% over its volume when stationary, the solid particles are placed in random motion, ebullated, within the vessel by the upflowing streams. The characteristics of the ebullated mass at a prescribed degree of volume expansion is such that a finer, lighter particulate solids, which are the coal solids, will pass upwardly through the ebullated contact mass, which is the particulate catalyst so that the particles constituting the ebullated mass are retained in the reactor and the finer, lighter material or coal may pass from the reactor.

In a coal hydrogenation, the contact material herein catalyst, is added in the ratio of about 0.01 to 2.0 pounds of catalyst per ton of coal. Such catalyst would be from the class of cobalt, molybdenum, nickel, tin, iron and the like deposited on a base of the class of alumina, magnesia, silica, and the like. It is to be noted that the catalyst need not be added continuously, nor is it required that it be in fine admixture with the coal. The catalyst material is usually in the form of beads, chips, lumps, pellets and the like having 0.015 to 0.15 inch major dimension, or extrudates of about 0.02 inch diameter and 0.25 inch long.

It is a relatively simple matter to determine for any ebullated bed process the range of throughput rates of upflowing liquid and gas which will cause the mass of solid particles to become expanded and at the same time be placed in random motion without, however, any substantial quantity of the particles being carried away by the upflowing liquid. A fairly well-defined upper level of randomly moving particles establishes itself in the upflowing liquid and above this upper level 32 is called the upper level of ebullation above which few, if any, catalyst particles ascend.

The spaces between the particles of an ebullated mass are relatively large, with the result that the pressure drop of the liquid flowing through the ebullated mass is small and remains substantially constant so that the fluid throughput rate for the reactor is increased. Thus, a considerably smaller consumption of power is required for a given throughput rate. Moreover, the ebullated mass of particles promotes much better contact between the coal fines and gasiform streams than with any fixed bed process. Under these conditions, a significantly greater fluid throughput rate carrying the coal fines may be used without impairing the desired degree of contact than if conventional downflow or upflow through a fixed bed of contact particles is used.

Moreover, solid material can pass through an ebullated bed reactor where it would otherwise plug a fixed bed. Additionally, the random motion of particles in an ebullated mass causes these contact particles to rub against each other and against the walls of the vessel so that the formation of deposits thereon is impeded or minimized. The scouring action helps to prevent agglomeration of the contact particles and plugging of the reactor. This effect is particularly important where catalyst particles are employed and maximum contact between coal fines, hydrogen and the catalytic surface is desired, since the contact surfaces are exposed to the reactants for a greater period of time before becoming fouled or inactivated by foreign deposits.

The process of this invention may be carried out under a wide variety of conditions. In general, the gross density of the stationary mass of contact material will be between about 25 and 200 pounds per cubic foot, the flow rate of the liquid will be between about 5 and 120 gallons per minute per square foot of horizontal cross section of the ebullated mass and the expanded volume of the ebullated mass usually not more than about double the volume of the settled mass and preferably about 30 percent. A recycle liquid stream 34, which may be internal or external of the reactor, may be removed from above the upper level of ebullation 32 and recycled by pump 36 to the bottom of the reactor 30 to maintain the desired superficial liquid velocity in the reactor. Spent catalyst particles may be removed from reactor 30 from time to time by drawoff 37.

Preferred reactor operating conditions permit coal throughput to be at the rate of 15–150 pounds per hour per cubic foot of reactor space, with a yield of unreacted coal between 5 and 25 percent of the quantity of moisture and ash free coal feed. The relative size of the coal and catalyst particles and conditions of ebullation are such that the catalyst is retained in the reactor while the unreacted char is carried out with the reaction products and the slurry oil. The recycle hydrogen feed rate should be 10 to 50 s.c.f. of equivalent hydrogen per pound of dry coal feed.

The degree of hydrogenation in reactor 30 can be limited to that which will leave sufficient unreacted coal to make hydrogen in a subsequent gasification stage. This hydrogen could then be recycled for use in the hydrogenation step. This type of process would be advantageous in areas where hydrogen is difficult to obtain.

The effluent stream 38 passing to high pressure separator 40 includes gaseous fractions but is virtually free of solid particles of contact material, although it may contain some unconverted coal and ash in the liquid. From the separator 40, a gas stream is removed at 42 and passed to absorber 44. A hydrogen recycle stream in line 46 may be returned to the reactor 30 to supplement the hydrogen requirement. A liquid stream 48 can be joined with liquid stream 49 from the high pressure separator 40, and then passed to the low pressure recovery system 50.

The low pressure separator 50 permits removal of a high B.t.u. heating value gas product at 52 and a solids-free liquid at 54. A separate liquid stream containing char is removed at 56. A portion of the liquid from lines 54 and 56 may be used as the slurry oil 18.

A significant feature of this invention is the discovery that the coal particles rapidly break up in the pretreatment tank 28 under the conditions of high temperature and pressure hydrogen gas. By the time the coal has reached the main reactor 30, it is of such small size that ebullation reaction with the small sized catalyst material is possible. Such catalysts have a very fine pore structure and are superior for use in the hydrogenation process. These distintegrated coal particles produce no deleterious effects in the reactor, instead use of the initial lower temperature pretreatment reactor permits a much improved reaction in reactor 30.

Having thus described the invention in general terms, reference is now had to specific examples which have been carried out in accordance with the process of the present invention.

Example I

One specific comparative example of coal hydrogenation operations is illustrated by three samples of Illinois No. 6 bituminous coal which are processed in accordance with this invention using a pretreatment reactor upstream of the main reactor. Sample No. 1 is ground in a Raymond ball mill to 100 mesh of finer and processed in an ebullated bed reactor only. Samples No. 2 and No. 3 are ground to pass 20 mesh screen and are processed first in a pretreatment reactor before being introduced into the catalyst-filled ebullated bed main reactor. Comparative results are given in the Table I below.

TABLE I.—REACTIONS WITH ILLINOIS NO. 6 BITUMINOUS COAL

| Sample number | 1 | 2 | 3 |
|---|---|---|---|
| Coal particle max. size—mesh | −100 | −20 | −20 |
| Prereactor conditions: | | | |
| $H_2$ partial pressure, p.s.i. | | 2,010 | 2,010 |
| Temperature, °F | | 750 | 750 |
| Space velocity, lbs./hr./ft.$^3$ of reactor bed | | 120 | 120 |
| Reactor conditions: | | | |
| $H_2$ partial pressure, p.s.i. | 2,000 | 2,000 | 2,000 |
| Temperature, °F | 850 | 850 | 825 |
| Space velocity, lbs./hr./ft.$^3$ of reactor bed | 31 | 31 | 31 |
| Catalyst used | CoMo on alumina extrudates | CoMo on alumina spheres | |
| Catalyst size, inches | 1/16 | 1/16 | 0.02 |
| Catalyst density lb./ft.$^3$ | 35 | 35 | 45 |
| Overall conversion, percent | 95 | 95 | 95 |
| Conversion products: | | | |
| $C_1$-$C_3$ gas, wt. percent | 8 | 8 | 5 |
| $C_4$-E.P. liquids, wt. percent | 64 | 64 | 67 |

The above data demonstrate that substantially the same hydrogenation results are achieved with coal coarsely crushed to 20 mesh particle size and processed in the pretreatment reactor (per samples No. 2 and No. 3) as were achieved by grinding it to 100 mesh or finer in more expensive Raymond ball mill (per sample No. 1) and not using the pretreatment reactor.

ILLINOIS NO. 6 BITUMINOUS COAL ANALYSIS

Proximate dry analysis, wt. percent:
    Volatile matter _____ 40.9
    Fixed carbon _____ 48.8
    Ash _____ 10.3
Ultimate analysis, dry basis, wt. percent:
    Carbon _____ 68.9
    Hydrogen _____ 5.6
    Nitrogen _____ 1.1
    Sulfur _____ 4.8
    Ash _____ 10.3
    Oxygen (by difference) _____ 9.3

Another sample of coal feed, being coarser than 20 mesh is being fed to a hydrogenation reactor without first passing through the pretreatment reactor. The hydrogenation reactor contains a bed of 0.02 inch diameter catalyst. The attempt to operate the reactor fails as substantial amounts of catalyst are carried out of the reactor. The cause of the catalyst being carried out is the displacement of the catalyst by the large coal particles which do not have an adequate time to break up before forcing the catalyst particles overhead.

Example II

In another example of coal hydrogenation operations showing the advantage of the present invention, three samples of Pittsburgh Seam No. 8 coal are processed. As before, one sample is ground to 100 mesh or finer, and fed directly into a catalyst-filled ebullated bed reactor for hydrogenation therein. The other two coal samples are crushed to a fineness of about 20 mesh and processed first in a pretreatment reactor before being introduced into the catalyst-filled reactor. Results are given in the Table II below.

TABLE II.—REACTIONS WITH PITTSBURGH SEAM NO. 8 COAL

| Sample number | 4 | 5 | 6 |
|---|---|---|---|
| Coal particle max. size, mesh | −100 | −20 | −20 |
| Prereactor conditions: | | | |
| $H_2$ partial pressure, p.s.i. | | 1,010 | 1,010 |
| Temperature, °F | | 700 | 700 |
| Space velocity, lbs./hr./ft.$^3$ reactor | | 90 | 90 |
| Reactor conditions: | | | |
| $H_2$ partial pressure, p.s.i. | 1,000 | 1,000 | 1,000 |
| Temperature, °F | 850 | 850 | 825 |
| Space velocity, lbs./hr./ft.$^3$ reactor bed | 18 | 18 | 18 |
| Catalyst used | CoMo on alumina extrudates | CoMo on alumina spheres | |
| Catalyst size, inches | 1/16 | 1/16 | 0.02 |
| Catalyst density lb./ft.$^3$ | 35 | 35 | 45 |
| Conversion products: | | | |
| $C_1$-$C_3$ gas, wt. percent | 13 | 13 | 9.5 |
| $C_4$-E.P. liquids, wt. percent | 60 | 60 | 63.5 |
| Overall conversion, percent | 88 | 88 | 88 |

The above data demonstrate that substantially the same hydrogenation results are achieved by pretreatment of coal coarse crushed to 20 mesh particle size and processed in the pretreatment reactor (samples 5 and 6), as were obtained by fine grinding it to 100 mesh in the ball mill (sample 4) and not using the pretreatment reactor.

PITTSBURGH SEAM NO. 8 COAL ANALYSIS

Proximate dry analysis, wt. percent:
    Volatile matter _____ 42.8
    Fixed carbon _____ 48.1
    Ash _____ 9.1
Ultimate analysis, dry basis, wt. percent:
    Carbon _____ 74.0
    Hydrogen _____ 5.4
    Nitrogen _____ 1.2
    Sulfur _____ 4.3
    Ash _____ 9.1
    Oxygen (by difference) _____ 6.0

While I have shown and described a preferred form of embodiment of my invention, I am aware that modifications may be made thereto within the scope and spirit of the disclosure herein and of the claims appended hereinafter.

I claim:

1. In the hydrogenation of coal solids with a catalyst and hydrocarbon liquid wherein the coal, catalyst, liquid and hydrogen pass upwardly through a heated and pressurized reaction zone in a manner that the catalyst is placed in random motion in the liquid and an effluent is removed from the upper part of the reaction zone, the improvement which comprises:
(a) crushing the coal to a random size substantially all passing 20 mesh (U.S. Std.) with not less than 80% retained on 50 mesh;
(b) substantially drying, and slurrying the coal with a hydrocarbon liquid recovered from the hydrogenation to produce a pumpable slurry having in the order of 1:1 to 1:10 parts of coal per part of liquid;
(c) pressurizing the coal slurry to a reaction pressure in excess of 1000 p.s.i.g., adding hydrogen and heating said slurry to 600° to 750° F.;
(d) pretreating the resulting mixture consisting essentially of said coal slurry and hydrogen in a pretreatment zone for breaking up and partially dissolving the coal particles;
(e) passing said pretreated coal slurry containing finer coal particles than fed to the pretreatment zone and hydrogen upwardly through the said reaction zone at an effective fluid velocity to place the catalyst in random motion without substantial carryover of catalyst from the reaction zone; and (f) withdrawing an effluent product stream from the upper portion of the reaction zone.

2. The process of claim 1 wherein the amount of hydrogen added with the coal-oil slurry in said pretreatment zone is 5 to 25 s.c.f. equivalent hydrogen gas per pound of dry coal feed.

3. The process of claim 2 wherein the space velocity in said pretreatment zone is 50–300 pounds of coal per hour per cubic foot of reactor volume.

4. The process of claim 1 wherein the hydrogen partial pressure in the reaction zone is between 1000 and 4000 p.s.i., the temperature is between 750 and 950° F., and the space velocity is between 15 and 150 pounds of coal per hour per cubic foot of reaction space.

5. The process of claim 4 wherein the catalyst in the reaction zone has about 0.02 inch diameters.

6. The process of claim 3 wherein the coal is Illinois No. 6.

7. The process of claim 3 wherein the coal is Pittsburgh No. 8 seam and the liquid effluent stream from the reactor per ton of coal fed comprises about 4 barrels of a synthetic crude.

References Cited

UNITED STATES PATENTS

| | | | |
|---|---|---|---|
| 1,959,175 | 5/1934 | Pier et al. | 208—10 |
| 3,488,279 | 1/1970 | Schulman | 208—10 |
| 3,519,555 | 7/1970 | Keith et al. | 208—10 |
| 3,679,573 | 7/1972 | Johnson | 208—10 |

DELBERT E. GANTZ, Primary Examiner

S. L. BERGER, Assistant Examiner